UNITED STATES PATENT OFFICE.

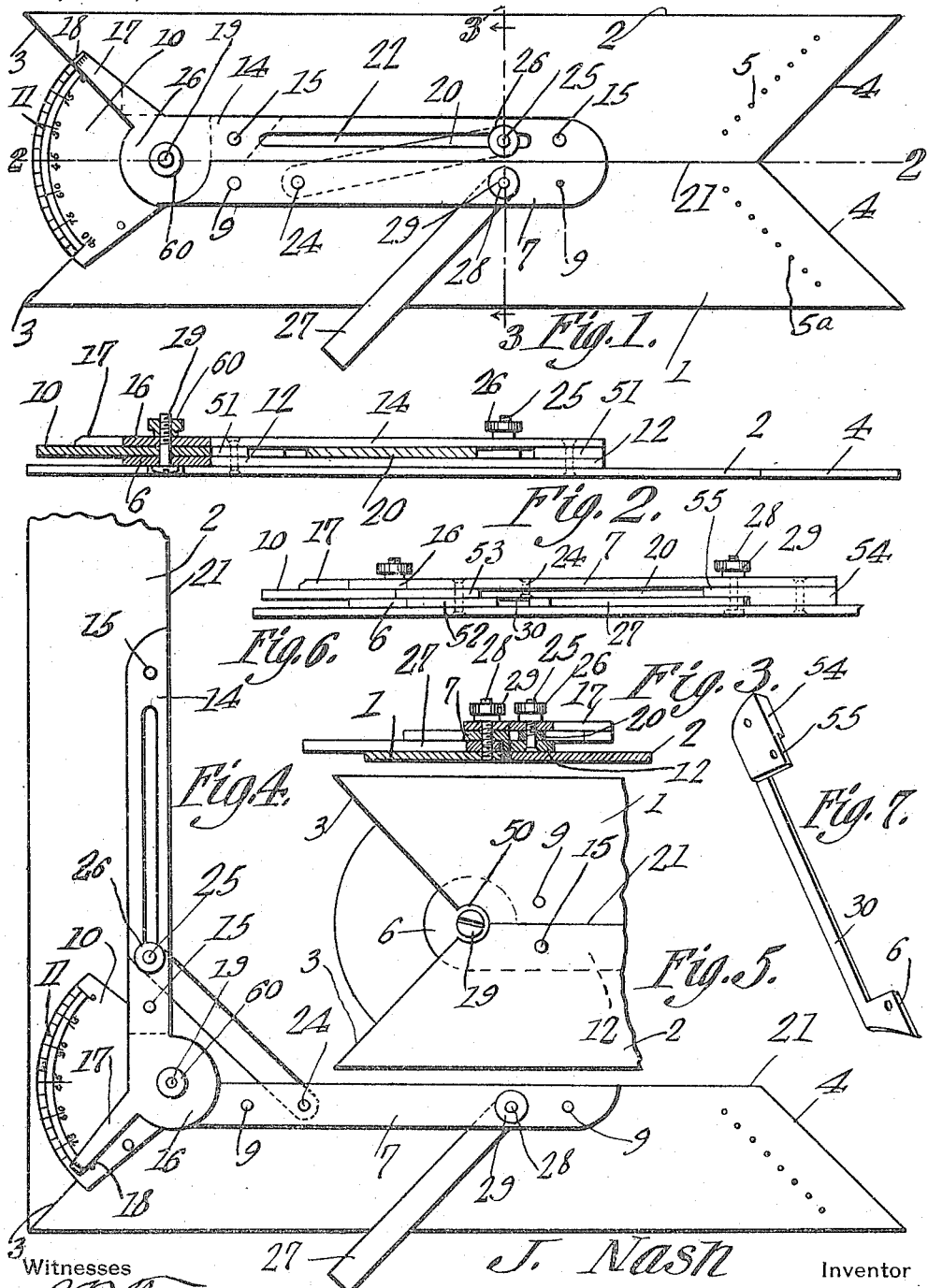

JOHN NASH, OF SEATTLE, WASHINGTON.

ADJUSTABLE TRIANGLE OR SQUARE AND PROTRACTOR.

1,207,980.  Specification of Letters Patent.  Patented Dec. 12, 1916.

Application filed November 11, 1915. Serial No. 60,913.

*To all whom it may concern:*

Be it known that I, JOHN NASH, a citizen of the United States, residing at Seattle, in the county of King and State of Washington, have invented a new and useful Adjustable Triangle or Square and Protractor, of which the following is a specification.

The device forming the subject matter of this application is adapted to be employed for laying off right angles and for laying off angles other than right angles, the structure combining a triangle and a protractor.

In addition to carrying out the foregoing operations, the invention is adapted to be employed for laying off different angles used in lettering, the structure embodying a movable arm adapted for the purpose above mentioned.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawing: Figure 1 shows the invention in top plan, the constituent members thereof being closed together; Fig. 2 is a longitudinal section on the line 2—2 of Fig. 1; Fig. 3 is a cross section on the line 3—3 of Fig. 1; Fig. 4 is a plan showing the device opened out in use as a right triangle, parts being broken away; Fig. 5 is a fragmental bottom plan; Fig. 6 is an elevation; Fig. 7 is a perspective delineating one of the constituent elements of the structure.

The device forming the subject matter of this application comprises a pair of coöperating members 1 and 2 in the form of plates or strips ordinarily fashioned from hard rubber or some other suitable substance, of a like nature. At one end, the members 1 and 2 are beveled as shown at 3, to define edges which, when brought into abutment, as shown in Fig. 4, cause the inner edges 21 of the members 1 and 2 to stand at a right angle to each other. The opposite ends of the members 1 and 2 are beveled as shown at 4 to define a right angle when the inner edges 21 of the members 1 and 2 are brought together as shown in Fig. 1. The member 2 is provided with a line of openings 5 disposed parallel to the edge 4 of the member 2. The member 1 is provided with a line of openings 5ª disposed parallel to the edge 4 of the member 1.

Mounted on the member 2 adjacent its beveled edge 3 is a spacer 6 having an extension 12 prolonged along the member 2 adjacent its inner edge 21. Mounted on the extension 12 adjacent the ends thereof are blocks 51 on which is superposed a strip 14 provided at one end with a circular head 16 of approximately the same size as the spacer 6, the head 16 having an arm 17 terminally provided with a vernier 18. Rivets or like securing elements unites the member 2, the extension 12, the blocks 51 and the strip 14, the latter being provided with an elongated slot 22. Mounted on the member 1 near to its inner edge 21 and near to its beveled edge 3 is a block 52 which is located in the same plane with the spacer 6. Superposed upon the spacer 6 is a head 10 having an extension 53 which lies above the block 52, the head 10 being mounted to move beneath the arm 17. Superposed upon the extension 53 of the head 10 is a strip 7 corresponding to the strip 14. Interposed between the strip 7 and the member 1 adjacent the beveled edge 4 of the member 1 is a block 54 having an extension 55. Rivets 9 or other securing elements unite the strip 7, the extension 53 of the head 10, the block 52 and the member 1, one of these rivets uniting also the strip 7, the extension 55 of the block 54 and the member 1.

The invention comprises a link 20, one end of which moves between the parts 14 and 12 of the member 2, the said end of the link 20 carrying a threaded stud 25 mounted to move in the slot 22 of the strip 14. Threaded onto the stud 25 is a nut 26 adapted to be clamped onto the strip 14. The other end of the link 20 enters between the strip 7 and a rib 30 which connects the block 54 with the block 6, and is connected to the strip 7 by means of a pivot element 24. A threaded stud 28 passes through the member 1, the extension 55 of the block 4 and the strip 7 and constitutes a pivot for an arm 27, a clamp nut 29 being threaded onto the stud 28 thereby to pinch the parts 55 and 7 down onto the arm 27, to hold the same in adjusted positions. A pivot element 19 passes through the spacer 6, the head 10 and the head 16, and carries a clamp nut 60, the pivot element constituting a means whereby the members 1 and 2 are united for relative swinging movement, the members 1 and 2 being cut away as indicated at 50 to receive the head of the pivot element 19.

When the device is disposed as shown in Fig. 4, the beveled edges 3 of the members 1 and 2 being in contact, the edges 21 of members 1 and 2 define a right angle. Any predetermined angle between the members 1 and 2 may be set off by means of the vernier 18 and the graduations 11 with which the part 10 is provided. As the members 1 and 2 move with respect to each other from the positions of Fig. 1 to the positions of Fig. 4, the said members may be held at any angle by tightening up the nut 26 on the stud 25, the stud sliding in the slot 22 of the strip 14 when the angle between the members 1 and 2 is changed. The straight edge or arm 27 may be disposed at various angles for lettering and other purposes, the straight edge being held in adjusted positions by tightening up the nut 29.

Let it be supposed that it is desired to draw a circle having a radius of three inches, and to lay down a tangent to the circle. Select any opening 5 in the member 2 and select any opening 5ª in the member 1. Move the members 1 and 2 apart on the pivot element 19 until the distance between the selected openings 5 and 5ª measures three inches. Clamp the members 1 and 2 in the position to which they have been spread. Place a pin in the selected opening 5 in the member 2 to serve as a center point. Insert a pencil through the selected opening 5ª in the member 1. Swing the members 1 and 2 (still in clamped relation to each other) with the pin as a center, until the pencil inscribes an arc. Press down the pencil to make a point where the tangent is to be drawn. Swing the members 1 and 2 to one side with the pin as a center, until the point where the tangent is to be drawn is disclosed. Place a straight edge against the pin and draw a radius from the pin to the tangent point, and prolong the radius an inch or two beyond the arc. Unclamp the members 1 and 2 and swing them, both on the pin and with respect to each other on the pivot element 19 until, by inspection, the outer edge of the member 1 coincides with the tangent point and lies at right angles to the prolonged portion of the radius, and draw a line along the outer edge of the member 1. This line will be a tangent to the circle at the point determined.

Having thus described the invention, what is claimed is:—

1. In a device of the class described, a pair of coöperating members; strips extended longitudinally of the members and secured thereto; a pivotal connection between the strips, one strip being provided with a scale and the other strip terminating in an extension adapted to move over the scale, one strip being provided with a slot; a link pivoted to the other strip; a stud carried by the link and adapted to ride in the slot; and clamping means carried by the stud and coöperating with the slotted strip.

2. In a device of the class described, a pair of coöperating members; strips secured to the longitudinal edges of the members, one strip terminating in a graduated head, and the other strip being provided with means for registering on the graduated head; a straight edge pivoted to one strip; a link pivoted to the said strip; and means for connecting the link with the other strip for adjustment longitudinally of said other strip.

3. In a device of the class described, parallel members; means for pivotally connecting the said members adjacent one end; and means for holding the said members at adjusted angles with respect to each other; each member being provided adjacent its other end with an opening, one opening being adapted to receive a center point, and the other opening being adapted to receive a scriber, whereby an arc may be struck and whereby a point on the arc may be determined by the scriber, that member which is provided with the scriber-receiving opening being movable on the pivotal connecting means to dispose one edge of said member in coincident relation to the point determined by the scriber, whereby a tangent to the arc may be drawn at said point.

In testimony that I claim the foregoing as my own, I have hereto affixed my signature in the presence of two witnesses.

JOHN NASH.

Witnesses:
 ANDREW NELSON,
 ELMER MAXEY.

Copies of this patent may be obtained for five cents each, by addressing the "Commissioner of Patents, Washington, D. C."